United States Patent [19]

Ebner

[11] Patent Number: 4,935,655

[45] Date of Patent: Jun. 19, 1990

[54] DIRECT-CURRENT MACHINE COMPRISING A PERMANENT-MAGNETIC STATOR

[75] Inventor: Jens Ebner, Bonndorf, Fed. Rep. of Germany

[73] Assignee: Standard Elektrik Lorenz Aktiengesellschaft, Stuttgart, Fed. Rep. of Germany

[21] Appl. No.: 264,009

[22] Filed: Oct. 27, 1988

[30] Foreign Application Priority Data

Oct. 28, 1987 [DE] Fed. Rep. of Germany ....... 3736519

[51] Int. Cl.$^5$ ................... H02K 21/26; H02K 37/00
[52] U.S. Cl. ........................... 310/154; 310/46; 310/49 R; 310/40 MM
[58] Field of Search ............ 310/40 MM, 154, 46, 310/152, 89, 177, 261, 49 R

[56] References Cited

U.S. PATENT DOCUMENTS

| 3,077,546 | 2/1963 | Schröter | 310/49 R |
| 3,693,037 | 9/1972 | West | 310/190 |
| 3,959,672 | 5/1976 | Walker et al. | 310/49 R |
| 4,642,494 | 2/1987 | Lundin et al. | 310/49 R |

FOREIGN PATENT DOCUMENTS 7012818 9/1971 Fed. Rep. of Germany .
2558958 7/1977 Fed. Rep. of Germany .

OTHER PUBLICATIONS

Kokai, No. 53-136609 (43) 11, 29, 1978 (19) JP.

Primary Examiner—Patrick R. Salce
Assistant Examiner—C. LaBelle
Attorney, Agent, or Firm—Spencer & Frank

[57] ABSTRACT

In a direct-current machine comprising a permanent-magnetic stator, the detent torque or resting moment of the rotor is to be reduced by simple and low-cost technical means. This is achieved by disposing the permanent-magnet shells of the stator asymmetrically with respect to each other.

2 Claims, 1 Drawing Sheet

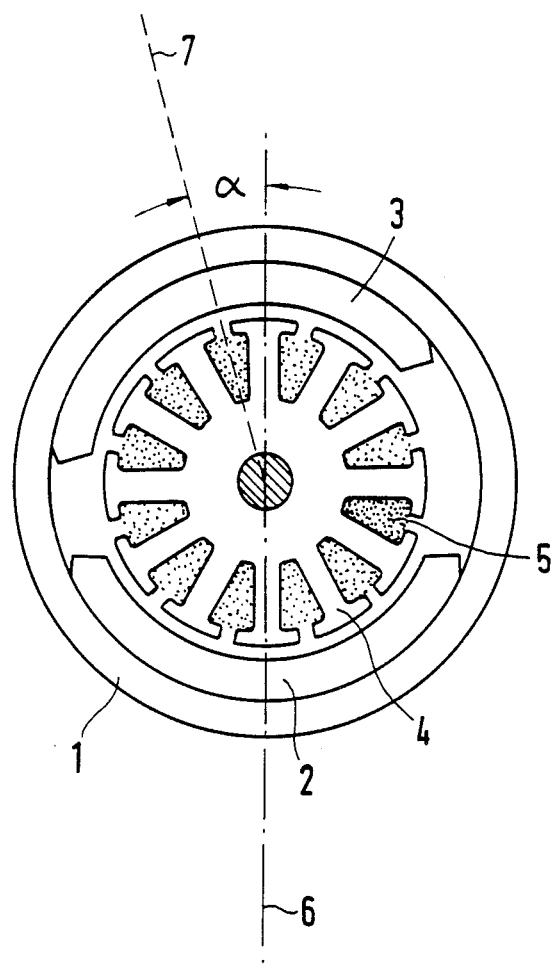

DIRECT-CURRENT MACHINE COMPRISING A PERMANENT-MAGNETIC STATOR

BACKGROUND OF THE INVENTION

The present invention pertains to a direct-current machine comprising a permanent-magnetic stator which contains at least one pair of permanent-magnet shells.

Such direct-current machines are generally known. In most of these direct-current machines, the permanent-magnet shells of a pair of permanent magnets are disposed symmetrically with respect to each other, i.e., their axes of symmetry, which, as a rule, coincide with the direction of magnetization, are in line with each other. It is also generally known that direct-current machines comprising such a stator have a relatively high detent torque or resting moment.

To reduce this detent torque or resting moment, it has already been proposed (DE-OS 25 58 958) to bevel the ends of the permanent-magnet shells to a V-shape in order to thus obtain an oblique stator exciter field. That solution requires specially shaped permanent magnets which have to be produced for that particular purpose. Thus, this known solution is uneconomical at any rate.

Other direct-current machines have become known (DE-GM 70 12 818 and Japanese Kokai No. 53-136609) in which each permanent-magnet shell is divided longitudinally into several permanent-magnet shells which are disposed circumferentially on the stator and are staggered with respect to each other. In this known solution, commercially available permanent-magnet shells can be used, but the assembly of a stator designed in this manner is more complicated and costly.

SUMMARY OF THE INVENTION

It is therefore the object of the invention to provide a direct-current machine in which the detent torque or resting moment is considerably reduced by simple and low-cost means.

In accordance with the invention, this object is achieved by disposing the permanent-magnet shells asymmetrically with respect to each other in such a manner that their axes of symmetry intersect at an angle which is equal to half the armature slot pitch.

The invention will now be described by way of example, with reference to the accompanying drawing, which shows a section of the direct-current machine in accordance with the invention.

DETAILED DESCRIPTION

The motor shown therein comprises a frame 1, which also serves as the magnetic yoke, two permanent-magnet shells 2 and 3, and a rotor 4. The rotor 4 has twelve slots 5 in which the rotor winding is located. In the embodiment shown, the slot pitch is 30°. As can be further seen from the drawing, the permanent-magnet shells 2 and 3 are disposed asymmetrically with respect to each other, i.e., the axis of symmetry 6 of the permanent-magnet shell 2 and the axis of symmetry 7 of the permanent-magnet shell 3 include an angle $\alpha$ which is equal to half the armatur slot pitch, i.e., 15° in the embodiment shown.

Trials have shown that with the application of the proposed teaching, the detent torque or resting moment is considerably reduced.

I claim:

1. A direct-current machine comprising:
   a rotor armature having an annular ring including a plurality of circumferentially spaced radial winding slots, with adjacent ones of said spaced winding slots defining a pitch angle therebetween; and
   a permanent-magnet stator disposed around said rotor armature, said permanent-magnet stator having at least one pair of circumferentially spaced permanent-magnet shells, each one of said spaced permanent-magnet shells having a radial axis of symmetry, and the axes of symmetry of a pair of shells of said at least one pair of permanent-magnet shells intersecting at an angle ($\alpha$) equal to half the pitch angle of adjacent winding slots of said rotor armature for reducing the resting moment of the direct-current machine.

2. A direct-current machine comprising:
   a rotor armature having an annular ring of a plurality of circumferentially spaced radial winding slots, with adjacent ones of said spaced winding slots defining a pitch angle therebetween; and
   means for reducing the resting moment of the direct-current machine, said means for reducing the resting moment including a permanent-magnet stator disposed around said rotor armature, said permanent-magnet stator having at least one pair of circumferentially spaced permanent-magnet shells, each one of said spaced permanent-magnet shells having a radial axis of symmetry and being asymmetrically arranged with respect to each other so that the axes of symmetry of each shell of each pair of spaced permanent-magnet shells intersect at an angle ($\alpha$) equal to half the pitch angle of adjacent ones of said spaced winding slots of said rotor armature.

* * * * *